(12) United States Patent
Vock et al.

(10) Patent No.: US 7,640,677 B2
(45) Date of Patent: Jan. 5, 2010

(54) TAPE MEASURE

(75) Inventors: Siegfried Vock, Merkers (DE); Richard Denk, Schönau (DE)

(73) Assignee: Stabila Messgerate Gustav Ullrich GmbH, Annweiler (DE)

( * ) Notice: Subject to any disclaimer, the term of this patent is extended or adjusted under 35 U.S.C. 154(b) by 316 days.

(21) Appl. No.: 11/622,499

(22) Filed: Jan. 12, 2007

(65) Prior Publication Data

US 2007/0163138 A1 Jul. 19, 2007

(30) Foreign Application Priority Data

Jan. 19, 2006 (DE) .................. 20 2006 000 836 U

(51) Int. Cl.
*G01B 3/00* (2006.01)
(52) U.S. Cl. .................. 33/755; 33/761; 242/395.1
(58) Field of Classification Search .......... 33/755–771; D10/72; 7/119, 164; 242/395.1
See application file for complete search history.

(56) References Cited

U.S. PATENT DOCUMENTS

| | | | | | |
|---|---|---|---|---|---|
| 498,104 | A | * | 5/1893 | Buck .................. | 242/395.1 |
| 1,069,593 | A | * | 8/1913 | Weaver et al. ............. | 242/375 |
| 2,312,943 | A | * | 3/1943 | Van Buskirk ............ | 242/395.1 |
| 2,914,269 | A | * | 11/1959 | Freeman .................. | 242/405 |
| 3,141,628 | A | * | 7/1964 | Evans et al. ............. | 242/396.5 |
| 3,325,116 | A | * | 6/1967 | Quenot .................. | 242/397 |
| 3,686,767 | A | * | 8/1972 | Duda et al. .................. | 33/769 |
| 3,863,860 | A | * | 2/1975 | Quenot .................... | 242/395.1 |
| 3,922,790 | A | * | 12/1975 | Quenot .................. | 33/767 |
| 4,164,334 | A | * | 8/1979 | Rathbun et al. .......... | 242/405.3 |
| 4,228,589 | A | * | 10/1980 | Chemay .................. | 33/759 |
| D442,096 | S | * | 5/2001 | Martone .................. | D10/72 |
| 6,550,155 | B1 | * | 4/2003 | Hsu .................. | 33/755 |
| 7,434,330 | B2 | * | 10/2008 | McEwan et al. .............. | 33/770 |
| 2005/0017117 | A1 | * | 1/2005 | Moon et al. .............. | 242/390.8 |
| 2008/0010849 | A1 | * | 1/2008 | Lee .................. | 33/767 |
| 2008/0052944 | A1 | * | 3/2008 | Lee .................. | 33/767 |

FOREIGN PATENT DOCUMENTS

| | | |
|---|---|---|
| DE | 1194159 | 12/1960 |
| DE | 1944081 | 6/1966 |
| DE | 1992258 | 8/1968 |
| DE | 2614269 | 3/1977 |
| DE | 3404629 | 8/1984 |
| DE | 29700227 | 4/1997 |
| EP | 1074813 | 2/2001 |

* cited by examiner

*Primary Examiner*—G. Bradley Bennett
*Assistant Examiner*—Tania C Courson
(74) *Attorney, Agent, or Firm*—Dennison, Schultz & MacDonald

(57) ABSTRACT

A tape measure (10) including a housing (12) and a measuring tape that can be rolled up into it or drawn out of it, the tape extending from a drum (48, 50) disposed in the housing, the drum being rotatable by means of a holder element (40) extending from a handle (32) and at least in part passing through the first external surface (18) of the housing and originating from a support (46). In order to carry out internal measurements and measurements with a corner-stop position without problems from any orientation, there is provision for the handle (32) to be displaceably arranged along the drum axis inside the housing (12), for the handle (32) and the support (46) to merge flush with the first outer lateral surface in a first position (measuring position) or run offset to this surface, and in a second position (use position) to protrude, at least in part, above the first outer lateral surface, in order to engage the element.

15 Claims, 4 Drawing Sheets

TAPE MEASURE

BACKGROUND OF THE INVENTION

The invention relates to a tape measure comprising a housing into which a measuring tape can be wound, or, as the case may be, out of which it can be drawn, the tape extending from a drum rotationally supported in the housing, the drum being rotatable around an element like a handle, which at least in sections passes through a first external lateral surface of the housing, and which proceeds from a support or comprises it.

A tape measure with a frame is known from DE-U-297 00 227, which is taken up by a winding drum, which can be operated by means of a crank as a handle, which crank extends outside the frame. A tape measure known from DE-C-34 04 629 discloses a housing in which a rotating axis formed in one piece with a crank handle is placed.

Similar tape measures with hand-operated winding mechanisms are normally used for tape measures that are more than 10 meters in length and have a flat tape cross-section.

We also know of tape measures that have a spring-operated winding mechanism (EP-A-1 074 818). In that case, the measuring tape has an arched cross section.

Tape measures of this type, also called pocket tape measures, have a housing, also called a capsule, which is configured in such a way that the length of the base, which is provided with measuring units, can also be used for a so-called internal measurement between two defining surfaces. The zero-point of the tape measure abuts on one defining surface. The external edge of the housing, or as the case may be, the capsule, abuts on the opposite defining surface. The measurement read from the tape measure with the addition of the known length of the base of the housing makes up the "internal measurement."

Tape measures with hand-operated winding mechanisms do not offer the possibility of taking an internal measurement. In addition, the housings or capsules of long tape measures are fundamentally designed according to ergonomic considerations, without the possibility of a stop-situation comparable to that of a pocket tape measure.

The housing, or as the case may be, the capsules of pocket tape measures are often configured in a way that enables corner-stop positions from any orientation. This requires that the lateral surfaces run coplanar to each other. The coplanar aspect is not present in the housings of tape measures with hand-operated winding mechanism with ergonomically shaped housings.

DE-C-1 194 159 relates to a tape measure that can be wound up inside a housing and which is operated using a crank. The crank originates from a support embedded in the housing, which protrudes laterally outside the wall of the tape-measure housing by means of a circumferential flange.

A winding tape measure according to DE-U-1 944 081 comprises a crank to wind up the tape measure. The crank emerges from a support that protrudes above the external surface of the housing.

In the case of a tape measure according to DE-U-1 992 258, a crank that runs along the outside of the tape measure housing is used to wind up the measuring tape.

A measuring tape according to DE-B-96 14 269 can be rolled up by means of a crank that runs outside the housing.

SUMMARY OF THE INVENTION

The present invention is based on the task of further developing a tape measure with a hand-operated winding mechanism to include the measuring advantages of pocket tape measures, so that internal measurements and measurements of corner stop positions can be undertaken from any orientation.

In order to accomplish this task, the invention essentially provides for the element to be slideably positioned along the drum axis inside the housing, for the element as well as its support in a first position (measuring position) to merge flush with the outer lateral surface or run offset thereto and protrude in a second position (use position), at least in part, above the first external lateral surface, in order to engage the element. The element, like the handle, can be locked inside the housing in the first and/or second position.

The element, like the handle and the support, form a unit, wherein the outside of the support does not protrude above the corresponding outside surface of the housing in the measuring position of the tape measure. In other words, the element with the support can be positioned in the measuring position in such a way that the outside of the housing is completely clear, that is, sections of the support and the element do not protrude. As a result, in the measuring position, no section of the element, including its receiver, or as the case may be, its support, protrudes above the outer surface of the housing. The element includes a holder such as a crank element, by means of which the element can be rotated. The holder, or as the case may be, the crank element, are pivotably attached to the support.

It is provided in particular that the housing has a flat cuboid geometry with a base surface extending in the direction in which the measuring tape is extracted, vertical to which extend the first outer lateral surface and a second outer lateral surface that runs parallel thereto, and that between the outer lateral surfaces a peripheral surface that merges with the base surface extends, a first section of the peripheral surface proceeding from a first end of the base surface and having or defining a slot extending along the base surface, through which the measuring tape passes, and a second section proceeding from another end of the base surface and extending vertical thereto. The base surface, the first and second outer surfaces and the peripheral surface are outer surfaces of a base wall, first and second outer lateral walls, and a peripheral wall that form the housing. The housing also preferably has two half-shells, so that the peripheral and base wall is divided into two parts.

A further development of the invention provides for the handle to comprise a cup-shaped base section, which has a first hollow cylinder section running along the inside of the housing, which is the drum onto which the measuring tape is wound. The first hollow cylinder extends from a floor wall of the base section, which wall is aligned parallel or substantially parallel to the first outer lateral surface and has a pivotable holder element, which can preferably be completely embedded in the floor wall or can be disposed to project above it. The holder element is preferably pivotable around an axis that runs vertical to the rotating axis of the drum. The floor wall, or as the case may be, the same and the first hollow cylinder section therefore form the support.

In addition, there is a lug that extends from the floor wall in the direction of the second outside lateral wall, which can be acted upon by a force via a through-hole in the second outside lateral wall in order to effect axial displacement of the base section. The through-hole is preferably covered by an elastic element such as a membrane.

A further development of the invention provides for the through-hole to be surrounded by a circular disc element, which is aligned parallel or substantially parallel to the outer surface of the second lateral wall, or as the case may be, the outer surface thereof; a second hollow-cylinder section extends from the disc plate, this section being surrounded by the first hollow-cylinder section of the handle and displaceable along it.

The first and second hollow cylinder sections therefore form a crank-drum which has a divided, or as the case may be, telescoped shape, the part of which that has the holder element being arranged that it can be optionally completely embedded in the housing or protrude in part from the same.

The first position can be termed the parking or use position, as the measuring tape is not rolled up, the measuring tape actually being used for measuring. The second position can be called the "raised handle or use position," in which the handle is in the optimum position for function.

In order to unequivocally position the handle in both the use and measuring positions, the handle can be locked in each position. For this purpose, at least one locking element that can be acted on by a force and runs perpendicular to the drum axis can extend from the second hollow cylinder section, to which element locking receivers in the first hollow-cylinder section are assigned, whose axial intervals correspond to the intervals between the use and measuring positions of the handle. It is particularly provided that the locking element be designed as a spring pre-stressed sphere element.

In order to adjust the handle, it is necessary only that pressure can be exerted on the lug that extends from the floor wall of the handle, which can also be termed the crank mandrel, through the through-hole present in the second lateral wall, in order to displace the handle from the first locked position (parking or measuring position) into the raised handle or use position.

This invention proposes a tape measure comprising a housing into which a measuring tape can be rolled up, or as the case may be, from which a measuring tape can be pulled out, the tape extending from a drum disposed rotatably in the housing, it being possible to rotate the drum using a holder element, which extends from a handle and at least in part passes through a first outer lateral surface of the housing and originates from a support. In order to perform inside measurements and measurements in corner-stop positions from any orientation without difficulty, there is provision for the handle to be arranged slideably along the drum axis inside the housing, for the handle and the support to merge flush with the outer lateral surface in a first position (measuring position) or to run offset thereto, and in a second position (use position) to protrude at least in part above the first outer lateral surface in order to engage the element.

BRIEF DESCRIPTION OF THE DRAWINGS

Further details, advantages, and characteristics of the invention can be seen not only in the claims, the characteristics that are described in them—individually and/or in combination—but also from the following description of a preferred embodiment, which is illustrated in the drawing.

The following are shown.

DESCRIPTION OF THE PREFERRED EMBODIMENTS

Figure 1:
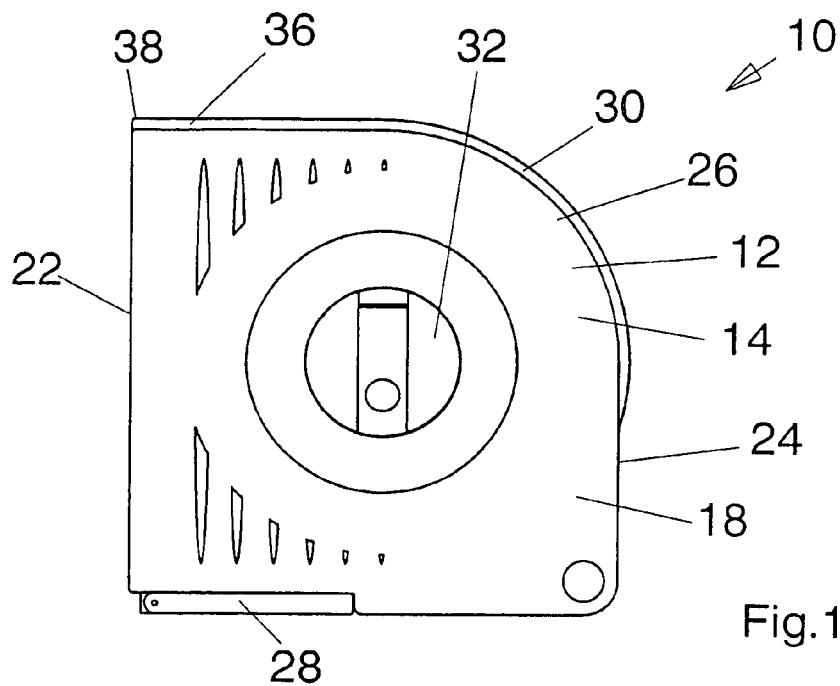
FIG. 1 The front side of a housing of a tape measure with an embedded handle.

The figures present a schematic diagram of a housing 12, which can also be called a capsule, of a tape measure 10 with a flat tape cross-section, which is suitable for internal measurements, or as the case may be, corner-stop measurements. This normally involves measuring tapes with a length of more than 10 meters, the measuring tape having a level cross-section, meaning not arched, as is usual in the case of pocket tape measures with spring-driven winding mechanisms.

The housing 12 of the tape measure 10, which consists of two half-shells 11, 13, has a flat cuboid geometry with a first lateral wall 14 forming the front and a lateral wall 16 extending parallel thereto and forming the second lateral wall 16. The outer surfaces 18 and 20 of the lateral walls 14 and 16 run coplanar to each other. Between the outer surfaces 18 and 20, and vertical thereto, extends a base surface 22, which is the outer surface of a base wall 23 of the housing 12. Originating in the base wall 23, and extending between the outer surfaces 18 and 20 of the lateral walls 14, 16, a peripheral wall 24, which in part describes a segment of a circle (Area 26), which extends opposite to a slot S that runs in the area of the base surface 22, through which slot the measuring tape, which is not depicted in the drawing, can be pulled by means of a loop 28 out of the housing 12, or as the case may be, retracted into it.

The base wall 23 and the peripheral wall 24 form a unit, however they are separated at a plane extending parallel to the lateral wall 14, 16, and can be joined together. The segments of the base and peripheral walls 23, 24 consequently form the rims of the housing half-shells 11, 13.

In addition, the peripheral wall 24 can in parts have a ridge 30, which facilitates handling of the tape measure 10, said ridge merging across the steps 31, 35 into the lateral walls 14, 16.

Embedded in the first lateral wall 14, meaning the front of the housing 12, is an element configured as a handle 32, arranged in an axially displaceable manner, as will be explained in detail below. The measuring tape can be wound up using this element, meaning the handle 32. In order to press the handle 32 out of the housing 12 so that it protrudes above the front, meaning the first lateral wall 14, a recess or aperture 33 is provided in the back, meaning the second lateral wall 20. Via the aperture 33, a force can act on the handle 32 in order to axially displace it.

Figure 3:
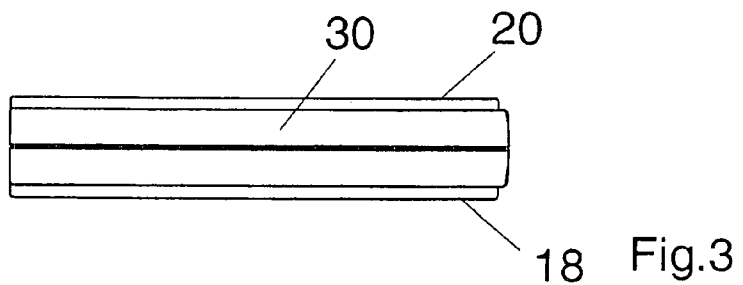
FIG. 3 A top view of the housing of the tape measure according to FIG. 2.
Figure 2:
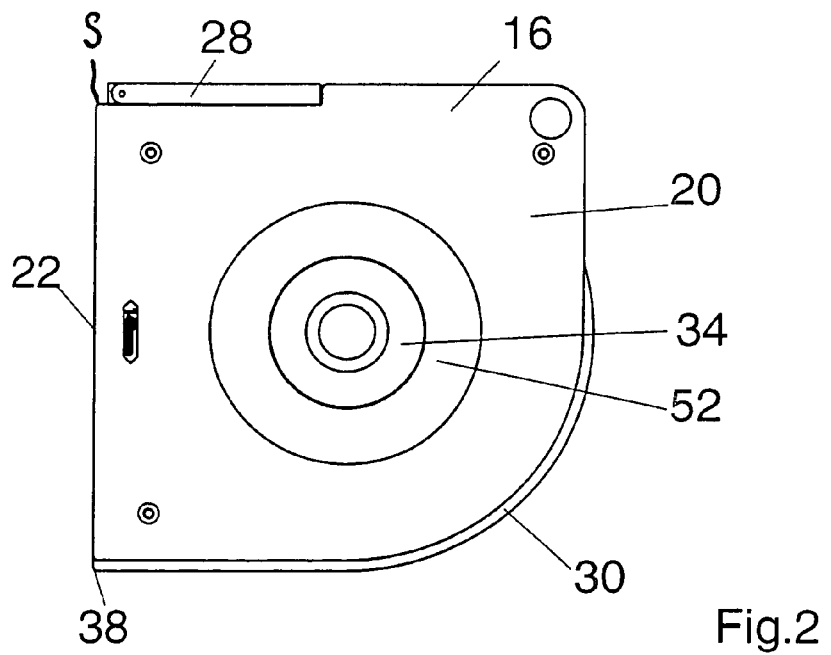
FIG. 2 The reverse side of the housing shown in FIG. 1.
Figure 7:
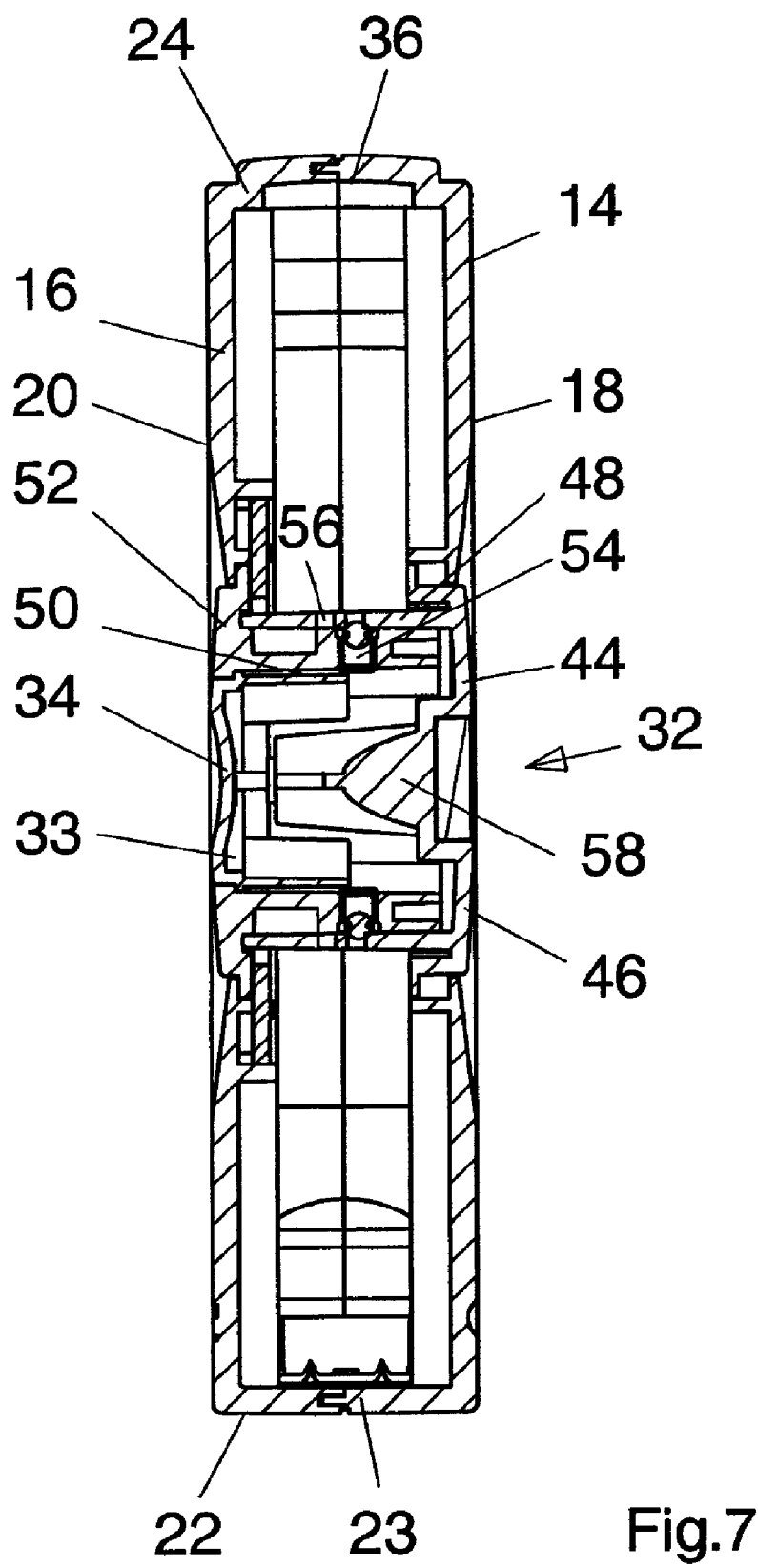

In the position with the handle 32 inside the housing 12, which is also called the parking or measurement position, the handle 32 is lowered into the housing 12 in such a way that the handle 32 does not protrude above the outer surface 18 of the first lateral wall 14, as shown in FIGS. 3 and 7.

This provides clear coplanar outer surfaces 18 and 20 on the front and back sides of the housing 12, so that the tape measure is suitable for corner-stops from any orientation. There is also the possibility of using the tape measure 10 for internal measurements. In order to do this, the section 36 of the peripheral wall 24, which section originates from the base surface 22 and is opposite the slot through which the measuring tape passes, extends perpendicular to the base 22. Consequently, the outer edge 38 of the housing 12 can be used as the stop position for measurement, provided that the length of the base surface 12 is dimensioned accordingly.

Figure 4:
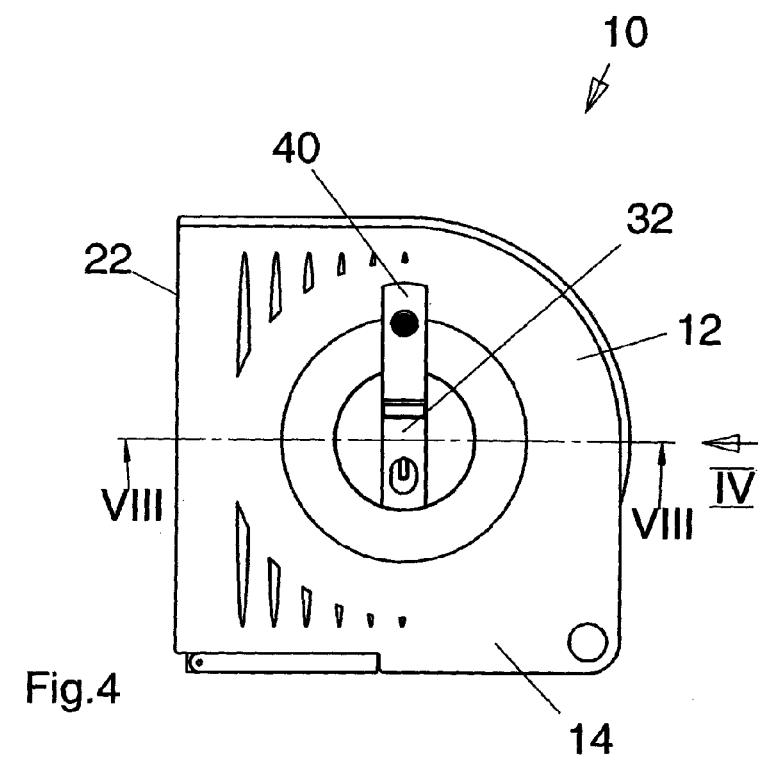
FIG. 4 The front of the housing of the tape measure according to FIG. 1 with the handle projecting over the outer lateral surface, FIG. 5 A top view of the tape measure according to FIG. 4, FIG. 6 An illustration of the tape measure according to FIG. 4 in direction IV, FIG. 7 A sectional view through the housing with the handle embedded and FIG. 8 A sectional view along the line VIII-VIII in FIG. 4 in an enlarged presentation.
Figure 6:
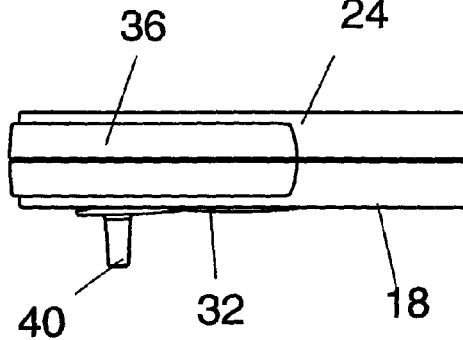
Figure 5:
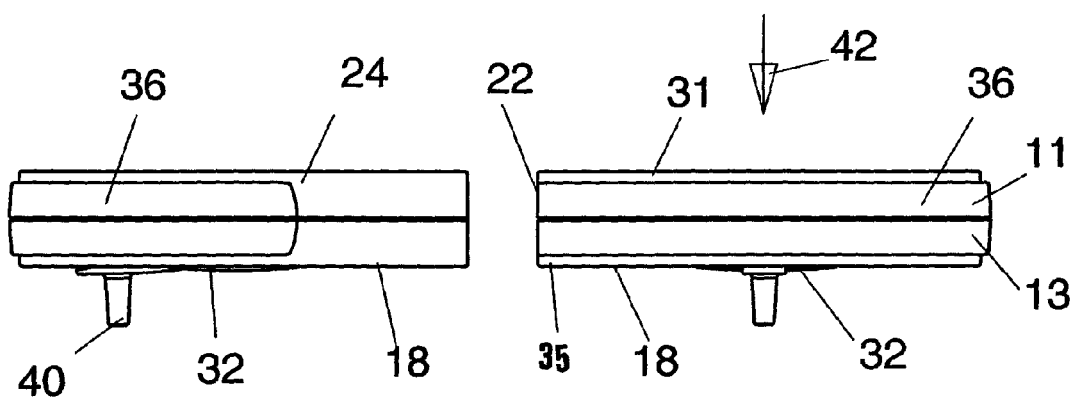

FIGS. 4 to 6 represent the tape measure 10 with the handle 32 in the so-called use position, in which the handle 32 protrudes out of the housing 12, meaning to some distance above the first lateral wall 14, or as the case may be, the front of the housing 12, and thereby above the outer surface 18, so that a pivotable crank handle 40 can be gripped, in order to wind up the measuring tape, which is not shown. Prior to this, the handle 32 must be pressed out of the housing 12. This is indicated purely in principle by the arrow 42 in FIG. 5.

Figure 8:
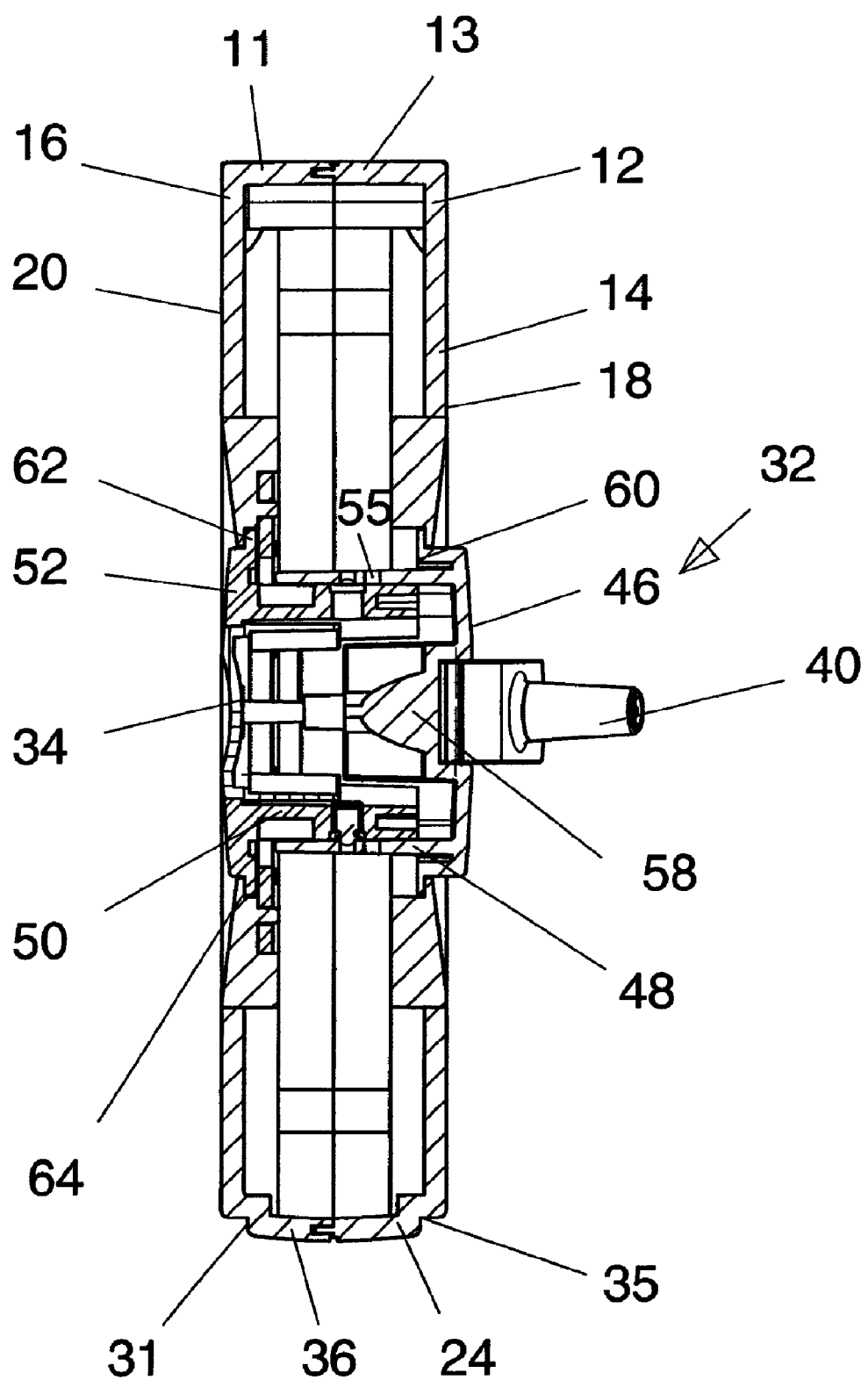

In order to embed the handle 32 completely in the housing 12, so that the coplanar outer surfaces 18, 20 of the front and back sides of the housing 12 are freely accessible, making the housing 12 suitable for corner-stops from any orientation, or in order to allow the handle to protrude from the housing 12, the designs shown in FIGS. 7 and 8 can be chosen, which are considered preferred. Other embodiments are also possible.

The design shown here uses a divided crank drum, which is made of a section of the handle 32 and a section of the back of the second lateral wall 16.

As FIGS. 7 and 8 show, the handle 32 has a cup-shaped base section 44, which has a floor wall 46 and a first hollow cylinder section 48, onto which the measuring tape can wound and which extends vertically or substantially vertically to the floor wall and in the direction of the back or second lateral wall 16. The base section 44, or as the case may be, the floor wall 46, form the support for the crank holder.

The first hollow cylinder section 48, as the first section of the drum, encloses a second hollow cylinder section 50 as the second section of the drum and can be locked thereto. The second hollow cylinder section 50 merges into a ring disc element 52 along the back or second lateral wall 16, but the ring disc element does not protrude above the outer surface 20 of the wall and is pivotably mounted on the back.

Spring pre-stressed locking elements 54 extend from the second hollow cylinder section 50, by means of which elements the first hollow cylinder section 48 can be locked in the measuring or parking position (FIG. 7) and in the use position (FIG. 8), in which the handle 32 protrudes above the outer surface 16 of the front or the first lateral wall 14. For this purpose, the first hollow cylinder section 48 has corresponding slots 55, 56, the axial intervals between them corresponding to the intervals between the measuring and use positions of the handle 32.

Extending from the floor wall 46 of the handle 32 in the direction of the aperture 33 of the rear lateral wall 14 is a lug 58 that can be termed a crank or ejector mandrel, by means of which the handle 32 can be moved from the measuring or parking position (FIG. 7) into the use position, in which the handle 32 protrudes above the outer surface 16 of the front lateral wall 14. In order to do this, the proper pressure must be exerted via the aperture 33. The aperture 33 can be covered by a rubber element such as a membrane 34, which can be fixed by the second hollow cylinder section 50, as shown in FIG. 7.

There is also the possibility of a disk element extending from the mandrel 58, which element closes the aperture 33 in the parking position, and which can be pressed into the housing 12 by the exertion of force, in order to move the handle 32 into the use position. A rigid disc element that is accessible via the aperture 33, without the necessity of an integral design with the lug or mandrel 58, can also be used. In this case, the disc element must be operated separately.

An edge section 60 with an L-shape in sectional representation projects from the floor wall 44 of the handle 32 into the inside of the housing 12, which section in the use position (FIG. 8) rests against the first lateral wall 18 or front on the inside. This provides the drum comprised of the hollow cylinder sections 48, 50 with a mounting in an axial direction, as the ring disc plate element 52, which also has an L-shaped edge section 62, rests on a geometrically adapted step 64 of the second lateral wall 16. The step 64 defines a central opening in the second lateral wall 16.

FIGS. 3 and 7 illustrate that the handle 32 and its receiver do not project above, or as the case may be, protrude in any way above the lateral outer surface 18 of the housing 12 when the measuring tape is not rolled up, that is, when the tape measure is supposed to be used for measuring.

What is claimed is:

1. A tape measure comprising:
   a housing containing a measuring tape that can be rolled up inside the housing or drawn out of the housing,
   a drum mounted rotatably in the housing from which the tape extends,
   a handle element for rotating the drum, the handle element passing, at least at a portion thereof, through a first, substantially planar outer lateral surface of the housing and extending from, or incorporating, a support,
   the handle element being disposed displaceably along a drum axis inside the housing,
   the handle element and support being movable between a first position in which the handle element is flush with the first outer lateral surface or recessed within the first outer lateral surface, and a second position in which the handle element projects beyond the first outer lateral surface, at least in part, in order to engage the handle element,
   wherein the handle element comprises a cup-shaped base section which forms the support, the base section having a floor wall that is aligned parallel or substantially parallel to the first external lateral surface, and a first hollow cylinder section that extends from the floor wall within the housing, the cylinder section forming the drum at least in some sections, a holder element extends from the floor wall, and a lug extends from the floor wall toward the second lateral wall, the lug being constructed and arranged such that a force can be exerted on the lug via an aperture running in the second lateral wall in order to axially displace the base section.

2. The tape measure according to claim 1, wherein the housing has a flat cuboid geometry with a base surface extending in a direction in which the tape is pulled out from the housing, transverse to which runs the first outer lateral surface, and parallel to the first outer lateral surface a second outer lateral surface, and between the first and second outer lateral surfaces, there is a peripheral surface which merges with the base surface, the peripheral surface having a first section extending from a first end of the base surface and having or defining a slot running along the base surface through which the measuring tape passes, and a second section that extends from an opposite end of the base surface and extends transverse thereto.

3. The tape measure according to claim 2, wherein the base surface, the first and second outer lateral surfaces, and the peripheral surface are outer surfaces of a base wall, first and second lateral walls, and a peripheral wall, which together form the housing.

4. The tape measure according to claim 1, wherein the holding element can be embedded completely into the floor wall or arranged to protrude beyond the floor wall.

5. The tape measure according to claim 1, wherein the aperture is covered by a flexible element or can be closed by a disc element that is an integral part of the lug.

6. The tape measure according to claim 1, wherein the aperture is surrounded by a ring disc element that is aligned parallel or substantially parallel to the outer surface of the second lateral wall, or the external surface thereof, a second hollow cylinder section extending from the ring disc element, which is surrounded by the first hollow cylinder section of the handle element, and which can be displaced along the second hollow cylinder section.

7. The tape measure according to claim 6, wherein the first hollow cylinder section can be locked with the second hollow cylinder section.

8. The tape measure according to claim 7, wherein the first hollow cylinder section can be locked with the second hollow cylinder section in the first position and/or second position of the handle.

9. The tape measure according to claim 7, wherein the first hollow cylinder section can be locked with the second hollow cylinder section via at least one locking element that can be acted on by a force in a direction of the first hollow cylinder section, to which locking element locking slots are assigned in the first hollow cylinder section of the base section, axial intervals between the slots corresponding to intervals between the first and second positions of the handle.

10. The tape measure according to claim 6, wherein the ring disc element, on a peripheral side, has a step that rests on a geometrically adapted step of the second lateral wall.

11. The tape measure according to claim 6, wherein the ring disc element is rotatably mounted in the housing.

12. The tape measure according to claim 6, wherein the aperture is covered by a flexible element and is defined by the ring disc element and the second hollow cylinder section extending therefrom.

13. The tape measure according to claim 1, wherein the floor wall of the base section of the handle element has an edge with an L-shape in sectional representation that extends within the housing, the edge having a ring-shaped section along an inner side of the first lateral wall, which section, in the second position of the handle element, rests on a geometrically adapted ring section of the first lateral wall.

14. The tape measure according to claim 1, wherein the first and second outer lateral surfaces are each formed as a contact surfaces of the tape measure, and run perpendicular to the base surface and perpendicular to the second section of the peripheral surface, which extends transversely from the base surface.

15. The tape measure according to claim 1, wherein the drum receiving the measuring tape comprises two hollow cylinder sections, which encompass each other in sections and are axially displaceable in relation to each other.

* * * * *